Figure 1:
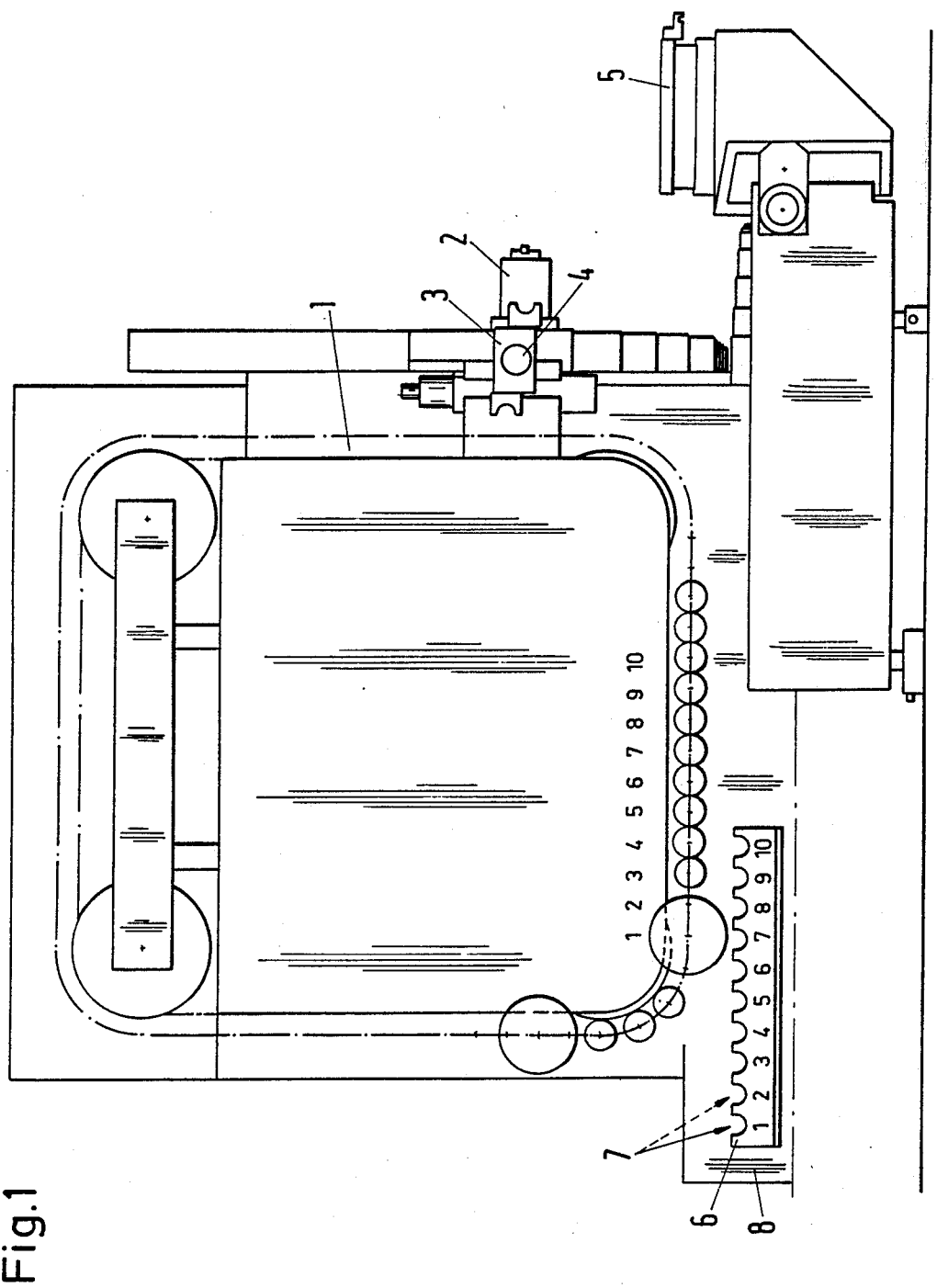

United States Patent [19]

Hammer

[11] Patent Number: 4,893,399
[45] Date of Patent: Jan. 16, 1990

[54] APPARATUS FOR CHANGING TOOLS OF A NUMERICALLY CONTROLLED MACHINING CENTER

[75] Inventor: Helmut Hammer, Berlin, Fed. Rep. of Germany

[73] Assignee: Werner und Kolb Werkzeugmaschinen GmbH, Berlin, Fed. Rep. of Germany

[21] Appl. No.: 186,051

[22] Filed: Apr. 25, 1988

[30] Foreign Application Priority Data

May 1, 1987 [DE] Fed. Rep. of Germany ....... 3714967
May 8, 1987 [DE] Fed. Rep. of Germany ....... 3715874

[51] Int. Cl.$^4$ .......................................... B23Q 3/157
[52] U.S. Cl. ..................... 29/568; 29/26 A
[58] Field of Search ............... 29/568, 26 A, 26 R; 211/1.5

[56] References Cited

U.S. PATENT DOCUMENTS

| 3,466,740 | 9/1969 | Harman | 29/568 |
| 3,781,974 | 1/1974 | Holzl et al. | 29/568 |
| 4,443,928 | 4/1984 | Kielma | 29/26 A |
| 4,505,020 | 3/1985 | Kinoshita | 29/568 |
| 4,547,955 | 10/1985 | Shiomi et al. | 29/568 |

FOREIGN PATENT DOCUMENTS

| 3316999 | 2/1984 | Fed. Rep. of Germany . | |
| 3330442 | 12/1984 | Fed. Rep. of Germany | 29/568 |
| 219708 | 3/1985 | German Democratic Rep. | 29/568 |
| 221673 | 5/1985 | German Democratic Rep. | 29/568 |
| 3613206 | 10/1987 | German Democratic Rep. | 29/568 |
| 21543 | 5/1974 | Japan | 29/568 |
| 163856 | 12/1981 | Japan | 29/568 |

Primary Examiner—William Briggs
Attorney, Agent, or Firm—Mark P. Stone

[57] ABSTRACT

The invention relates to an apparatus for changing tools of a numerically controlled machining center having a tool chain magazine which has a straight chain strand. Previously the tools were only changed individually. In order to acclerate the tool change, a cassette (6) having a plurality of tool receptacles (7) is proposed which can assume a normal position and a further position, in which arrangement, in the further position, one tool or a plurality of tools can be transferred directly from the cassette (6) to the strand (1) or vice versa and, in the normal position, the cassette (6) can be loaded and unloaded with regard to the tools or can be exchanged for another.

26 Claims, 11 Drawing Sheets

APPARATUS FOR CHANGING TOOLS OF A NUMERICALLY CONTROLLED MACHINING CENTER

In a machining center having a tool magazine which has a straight chain strand, the tools were previously exchanged individually by hand or automatically with a gripper.

The object of the invention is to accelerate the tool change.

This object is achieved according to the invention by a cassette having a plurality of tool receptacles which are arranged one behind the other, are immovable relative to one another and have the same spacings as the tool receptacles of the chain magazine, which cassette can assume a normal position and a first position, in which arrangement, in the first position, one tool or a plurality of tools can be transferred directly from the cassette to the strand or vice versa and, in the normal position, the cassette can be loaded and unloaded with regard to the tools or can be exchanged for another (but does not have to be).

This exchange is effected in particular by the cassette being removed from the device carrying it and by the other cassette being inserted into the latter. According to the invention, the number of tool receptacles is greater than four, in particular equal to 10.

In this way, it is possible to shorten the tool-change time. By means of the cassette, one tool or a plurality of tools, e.g. all the tools located in the cassette, can automatically be inserted into the magazine or removed from the latter. The cassette, in the normal position, is loaded and unloaded preferably manually or exchanged for another preferably manually.

The expressions "at the front", "at the back", "at the side", etc, used below and in the claims refer to the machining center, "at the front" being where the working spindle is located.

The invention primarily relates to an apparatus of the said type in which the chain of the magazine is arranged in a vertical plane, the tools are arranged perpendicularly to this plane and the magazine is loaded or unloaded by movements of the tools in the plane. These are apparatuses in which the tool receptacles are open at the side. For these cases, it is proposed according to the invention that the tool exchange location be in the area of the lower chain strand, and the cassette move away from the strand first of all downward and then to the back, and move toward the strand in the opposite direction (case 1).

Furthermore, apparatuses of the type mentioned are known in which the chain of the magazine is arranged in a vertical plane, the tools are arranged perpendicularly to this plane and the magazine is loaded and unloaded by movements of the tools perpendicularly to this plane. In this case, the receptacles for the tools are closed. For this purpose, it is proposed according to the invention that the tool exchange location be in the area of the lower chain strand, and the cassette move away from the strand of all laterally and horizontally, then downward and to the back, and move toward the strand in the opposite direction (case 2).

Finally, apparatuses of the said type are known in which the chain of the magazine is arranged in a vertical plane, the tools are arranged in this plane and the magazine is loaded and unloaded by movements of the tools in the plane. In this case, too, the receptacles are closed.

For this purpose it is proposed according to the invention that the tool exchange location be in the area of the lower chain strand, and the cassette move away from the strand first of all downward, then laterally and horizontally and then to the back, and move toward the strand in the opposite direction (case 3).

Of course, in the three said cases 1 to 3, the transfer location can also be arranged according to the invention at another strand, in particular at the back or top.

The invention further relates to an apparatus for changing tools of a numerically controlled machining center having a tool chain magazine which has a straight chain strand, comprising first means having a plurality of tool receptacles which are arranged one behind the other, are immovable relative to one another and have the same spacings as the tool receptacles of the chain magazine, second means for moving said first means between a normal position and a first position, third means for transferring one or more tools directly between said first means and said strand in said first position, said first means can be loaded and unloaded with regard to the tools in said normal position.

A preferred achievement according to the invention is that the cassette having U-shaped recesses engages into the chain strand, preferably the lower horizontal chain strand in such a way that, by locking and unlocking the engaged tool receptacle pockets of the chain magazine by actuating units arranged next to the chain strand and controllable individually or in blocks, the tools in the transfer area, individually or in blocks, are either transferred from the cassette into the chain magazine, by the relevant tool receptacle pockets being locked, or transferred from the chain magazine into the cassette, by the relevant receptacle pockets being unlocked, with the tools being held in the U-shaped recesses, and with a table being provided from which the cassette can be moved into the transfer position or can be removed from there and can be conveyed into the change position in which the cassette can be exchanged.

The object of the invention, which is to increase the rate of tool changes, is achieved by providing a cassette, which in a normal position for loading and unloading tools, can be exchanged for another cassette. Since tools must be transported from a tool magazine to machining center or vice versa, the embodiments of the invention increase the rate at which tools are changed from a transport vehicle to a tool exchange station and vice versa because tools need not be changed individually but are changed as the cassette carrying the tools is changed.

Figure 2:
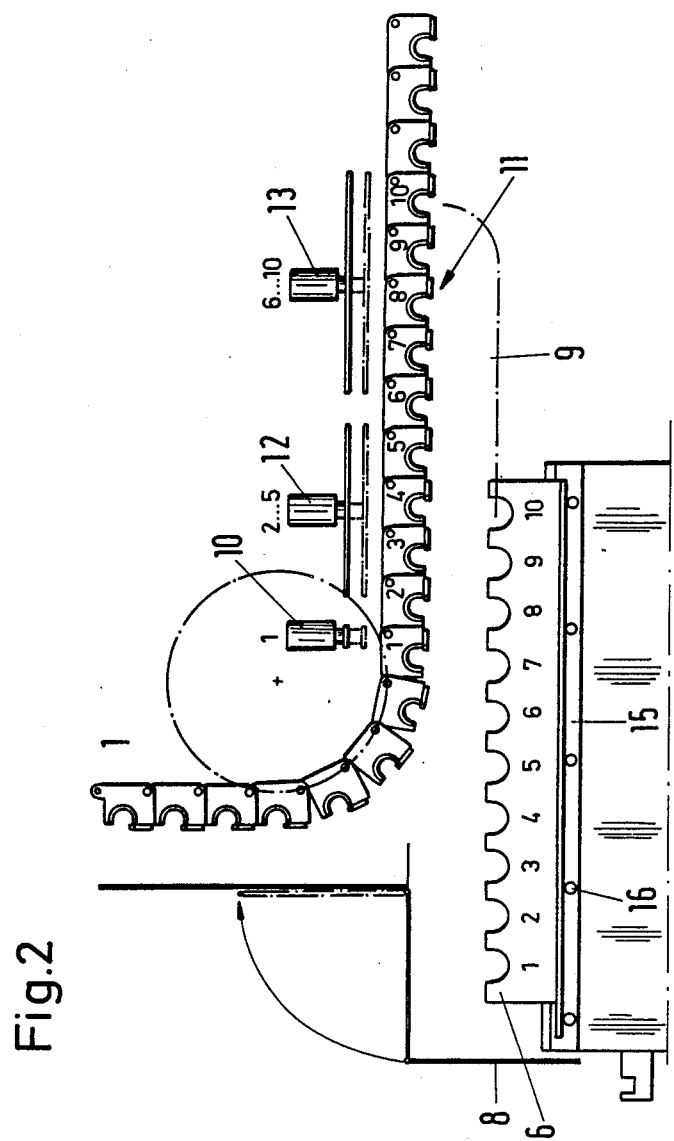
Figure 3:
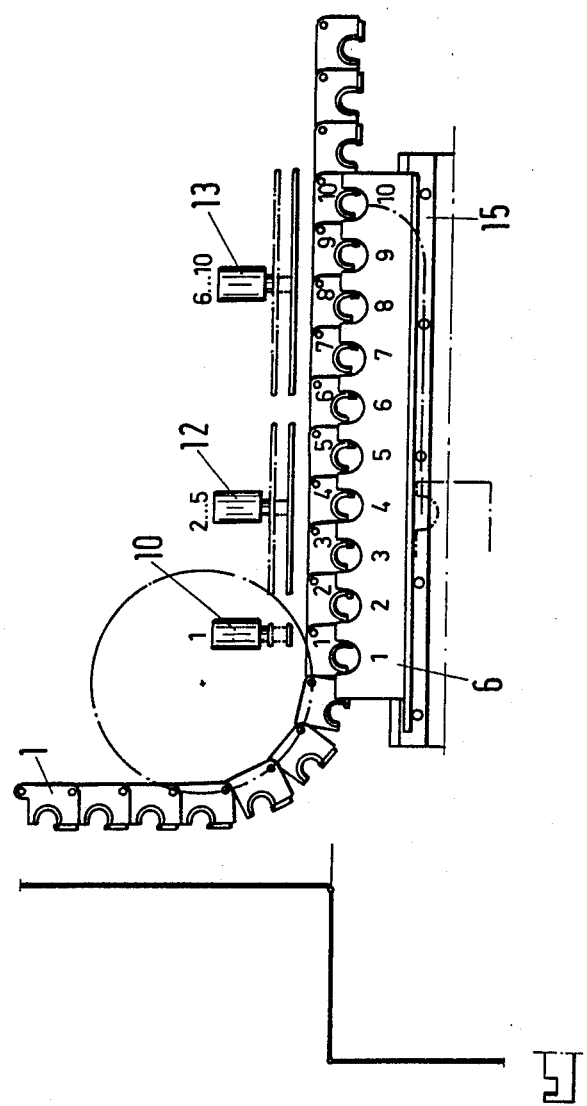
Figure 4:
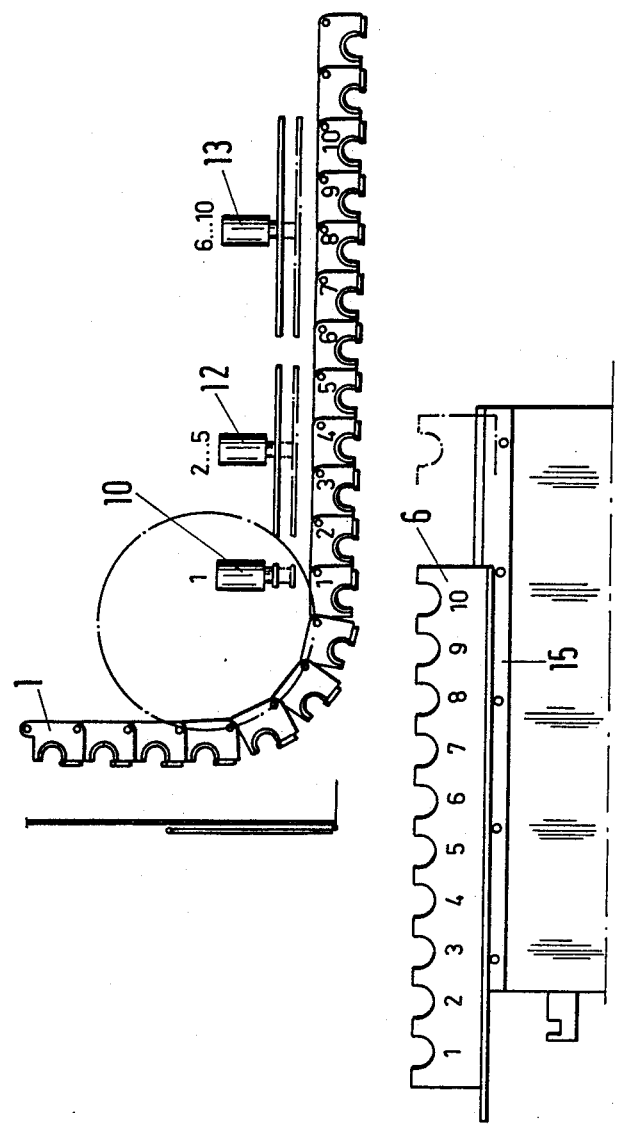
Figure 5:
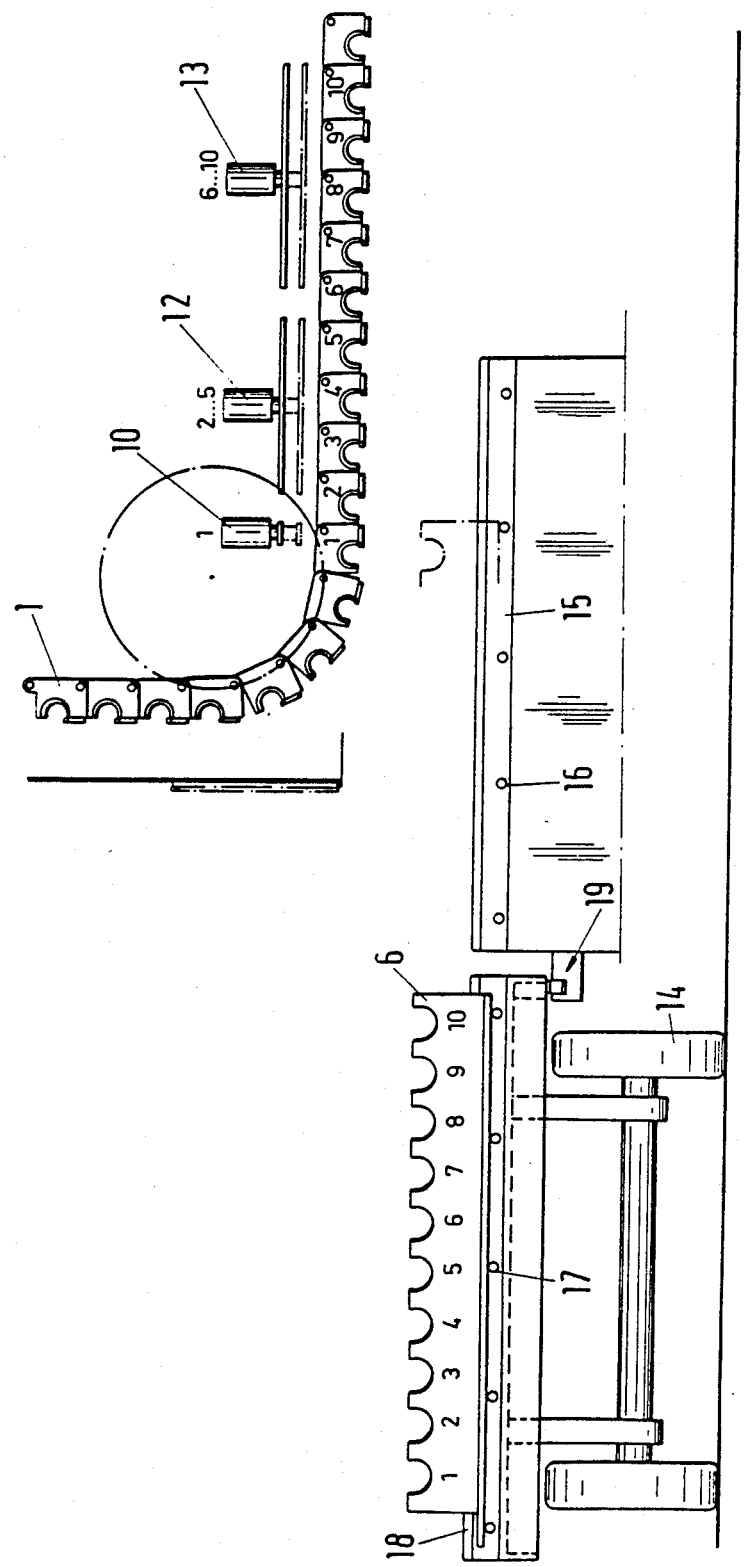
Figure 6:
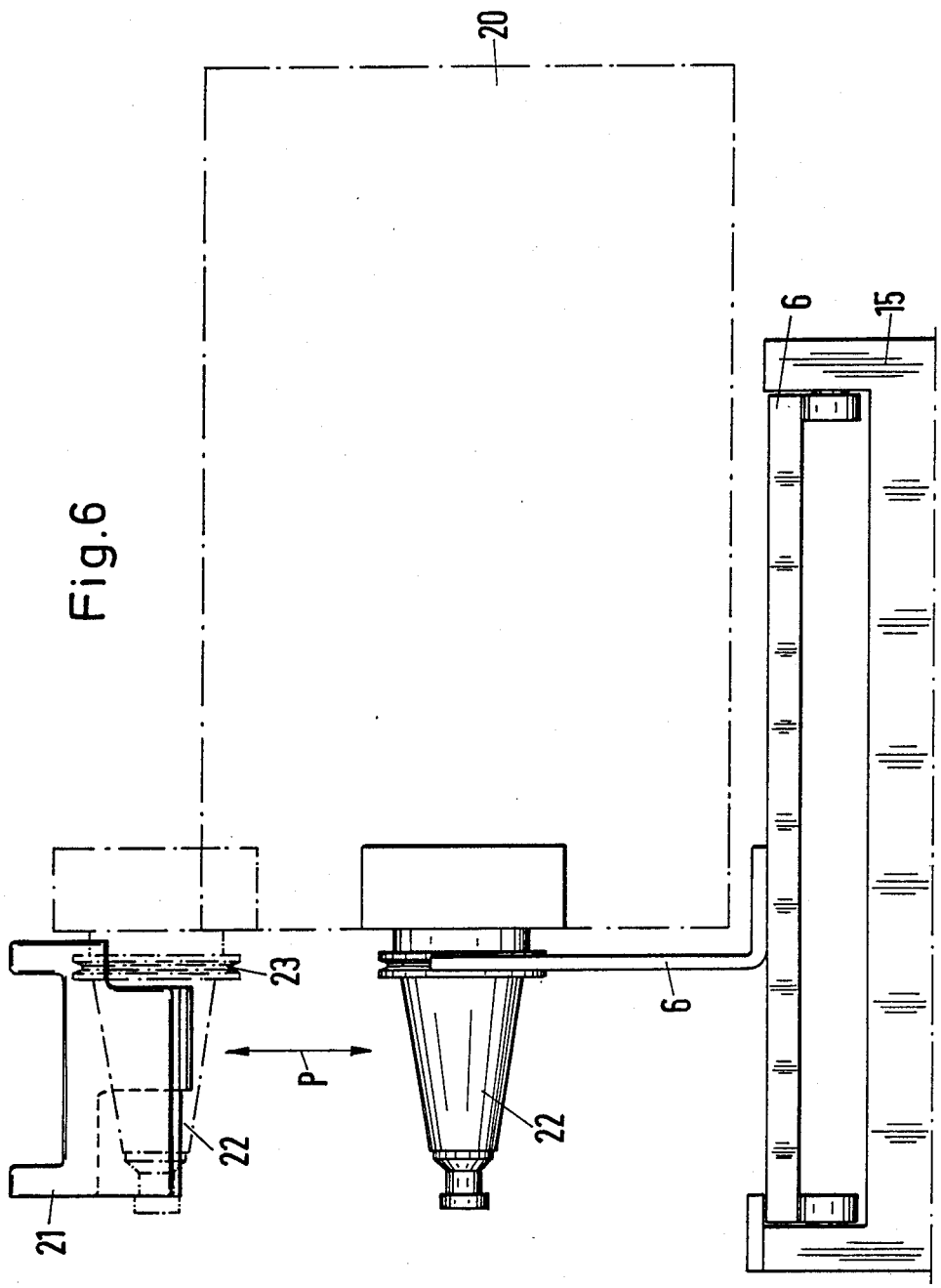
Figure 7:
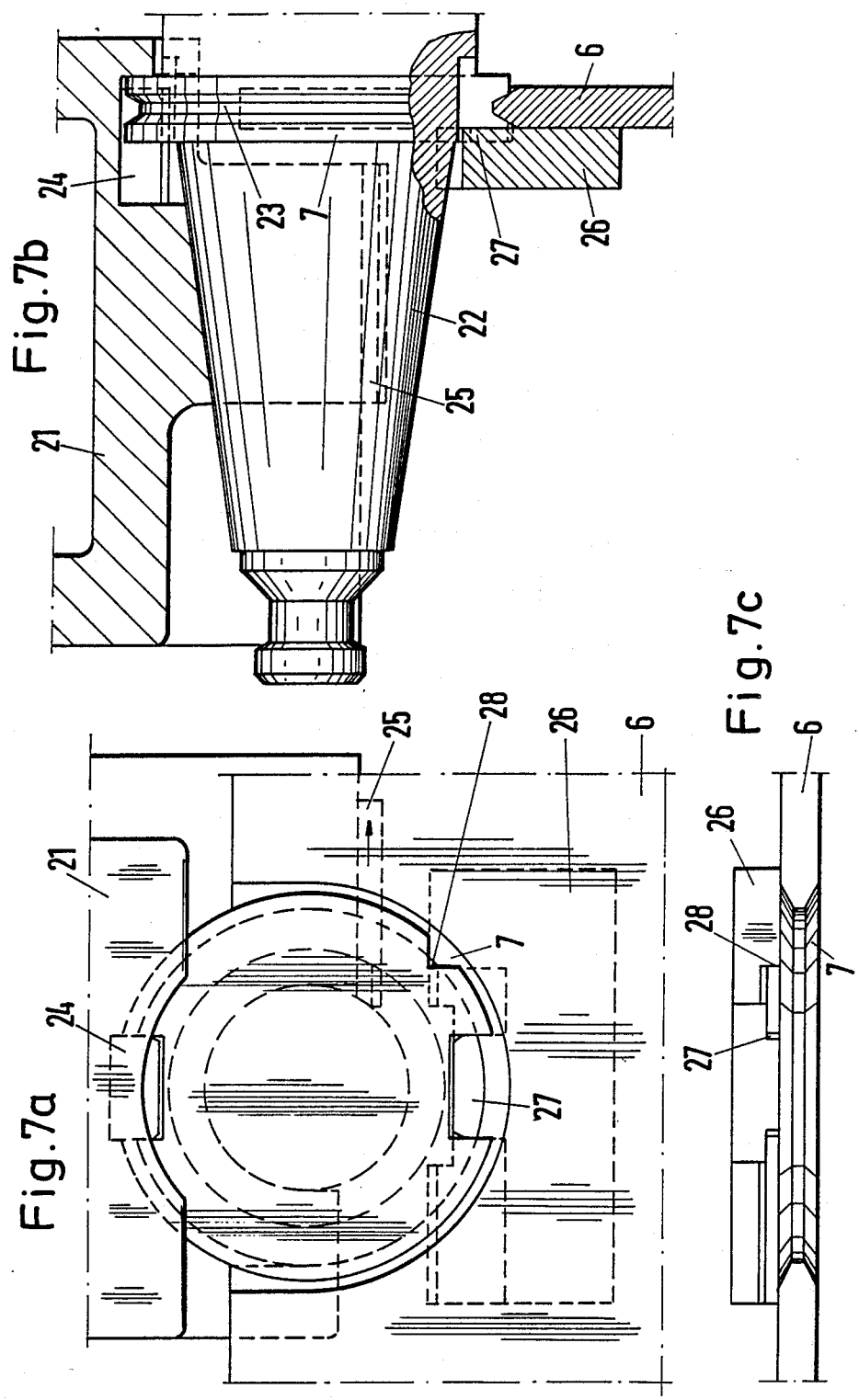
Figure 8:
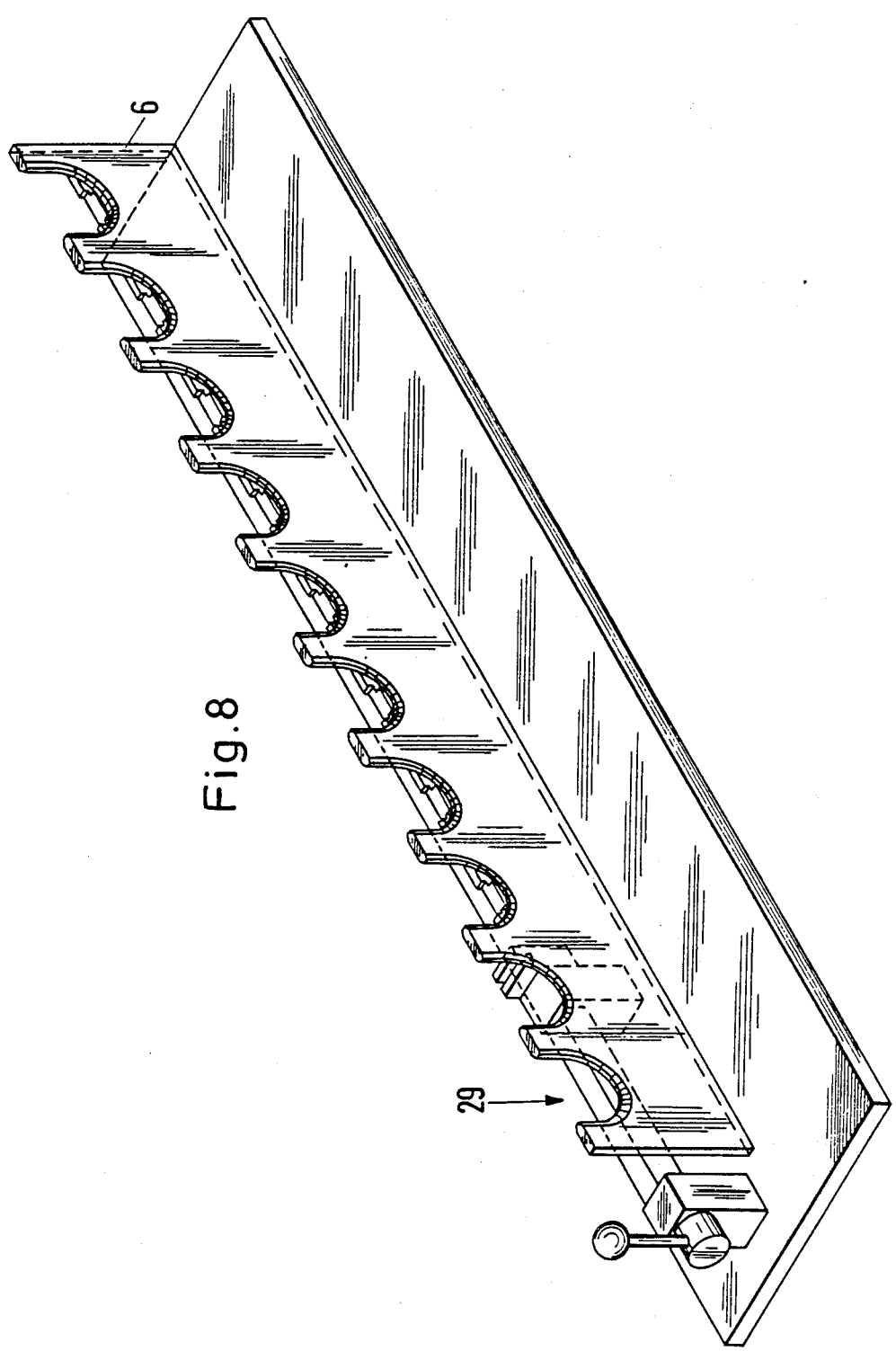
Figure 9:
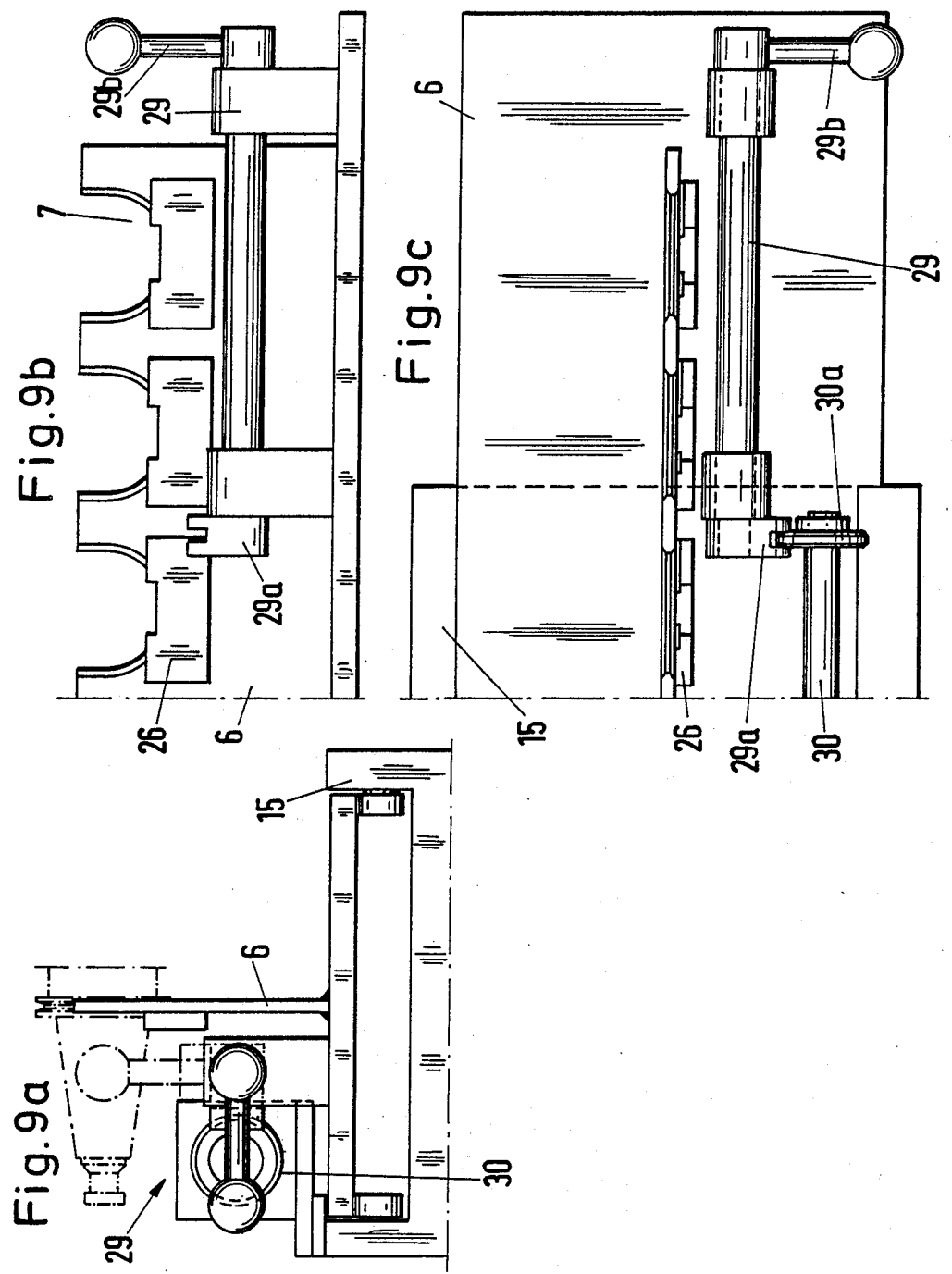
Figure 10:
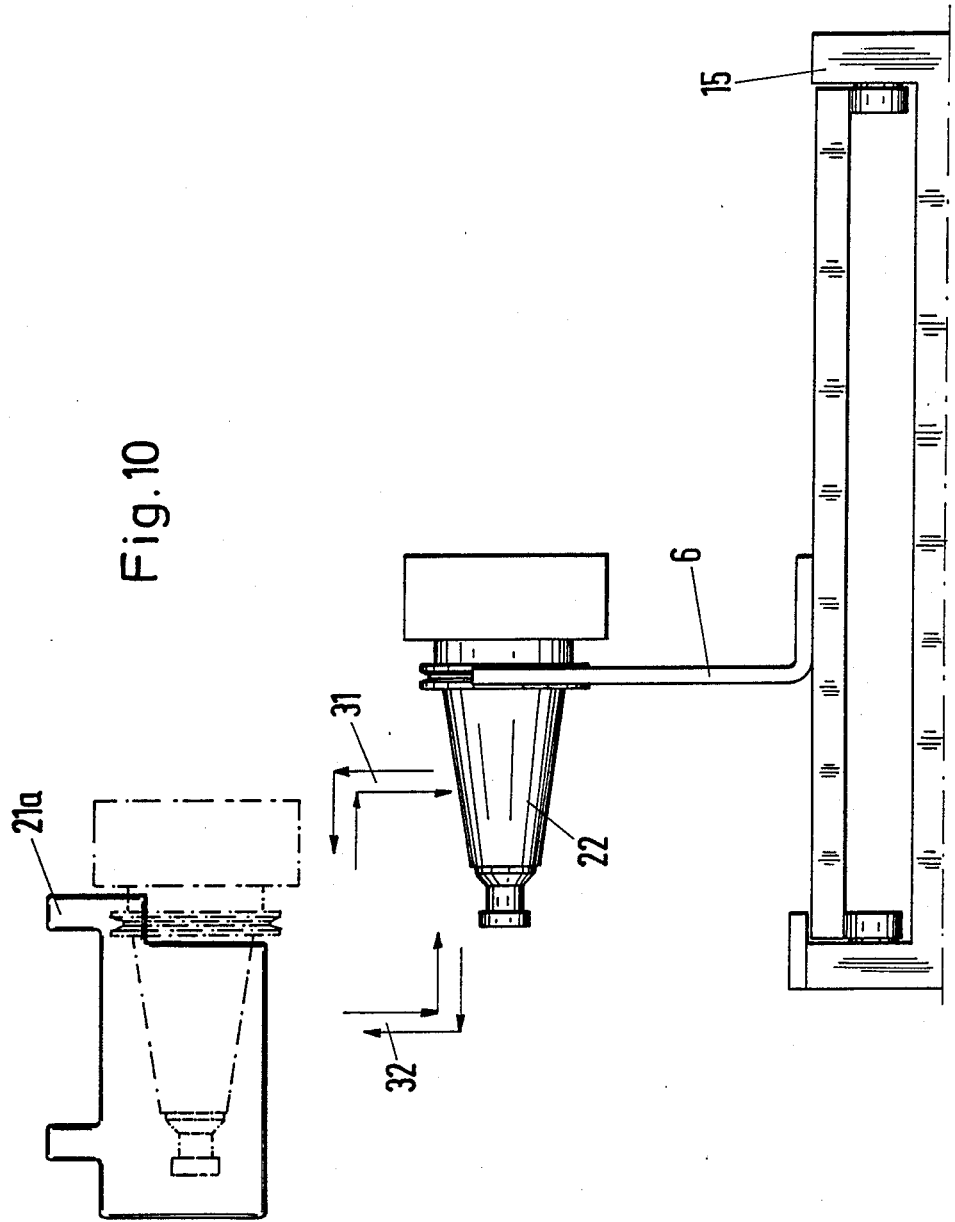
Figure 11:
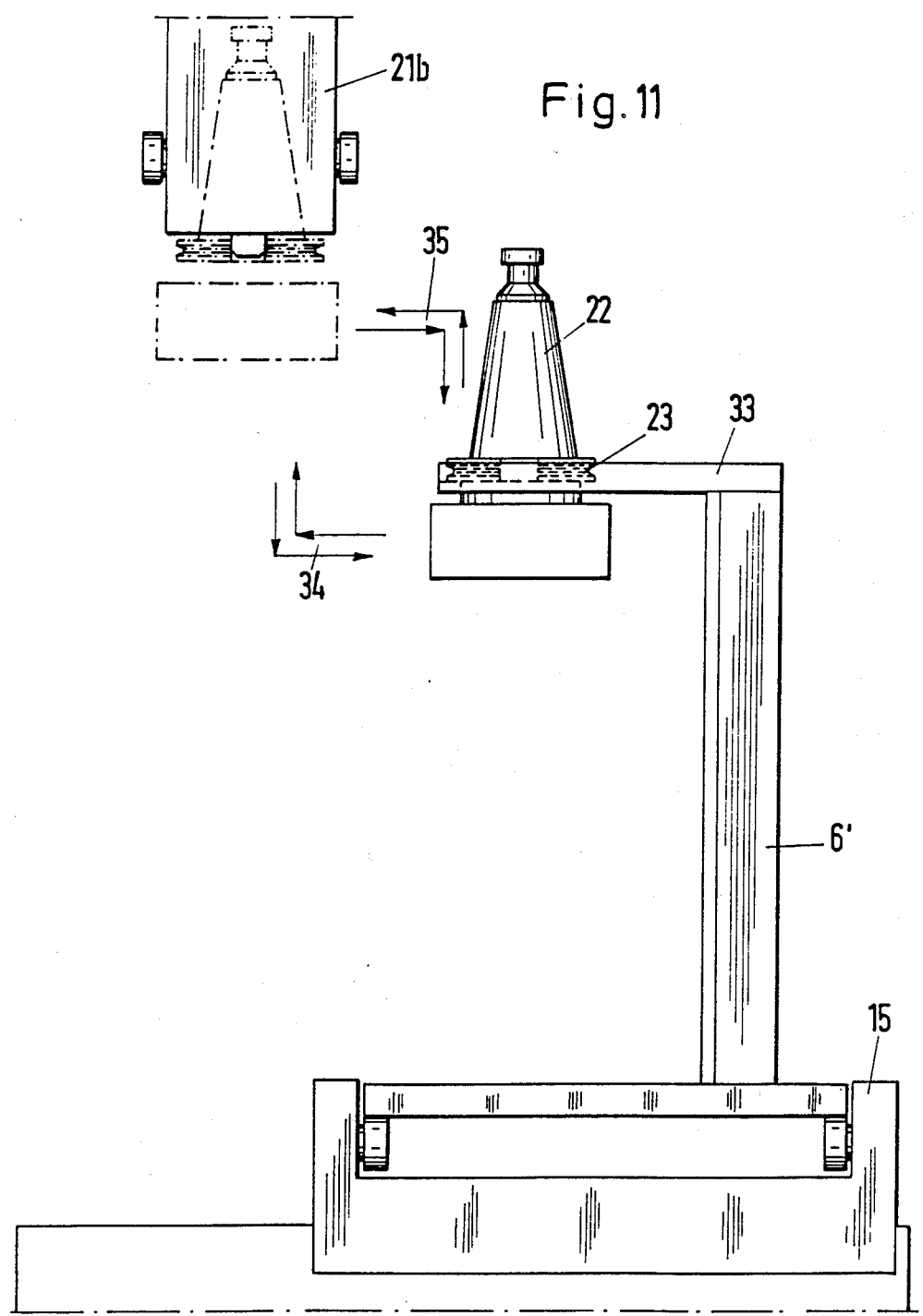

Further details of the invention follow from the drawing, in which:

FIG. 1 shows a side view of a machining center,

FIG. 2 shows the left-hand, lower part of FIG. 1 to an enlarged scale, the cassette being in the normal position, FIG. 3 shows the left-hand, lower part of FIG. 1 to an enlarged scale, the cassette being in the first position, FIG. 4 shows the left-hand, lower part of FIG. 1 to an enlarged scale, the cassette being in a further position, FIG. 5 shows the left-hand, lower part of the machining center, the cassette being on a vehicle, FIG. 6 shows the parts: cassette, tool and tool receptacle of the tool magazine in a view perpendicular to the views of the previous figures, FIGS. 7a, b, c show the upper, left-hand part of FIG. 6 to an enlarged scale, partly in section and partly with further parts, namely in three views, FIG. 8 shows a perspective view of the cassette, FIGS. 9a, b, c show a part of the cassette and a locking mechanism in three views, FIG. 10 shows a view corresponding to that of FIG. 6 of another embodiment, and FIG. 11 shows a corresponding view of a further embodiment.

FIG. 1 shows, viewed from the side, a machining center. 1 designates a chain magazine for tools, 2 designates a working spindle, 3 designates a tool changer of double-gripper design, 4 designates the axis about which the tool changer can rotate, 5 designates a workpiece table, 6 designates a tool cassette, 7 designates recesses in the cassette which represent receptacles for tools, and 8 designates a covering hood.

The path of motion which a cassette 6 can follow is illustrated in FIG. 2 by the broken line 9. 10 designates a locking-unlocking mechanism for the rearmost place no. 1 of a tool transfer location. 12 designates a locking-unlocking mechanism for the points 2 to 5 of the transfer location. 13 designates a locking-unlocking mechanism for the points 6 to 10 of the transfer area 11. In FIG. 2, the cassette is located in the normal position. If it has been moved along the broken line 9, it is located directly next to the magazine chain 1 ("1st position"). Tools can be exchanged in this position. FIG. 3 shows this position.

Whereas only one tool can be exchanged in place no. 1 in the normal cassette position, shown in FIG. 2, which tool is then moved into place no. 1 of the chain magazine, in a further position of the cassette (see FIG. 4) tools can be changed manually in places 1 to 5 of the cassette which are then in turn transported into places 1 to 5 of the chain magazine.

FIG. 5 shows a further variant: in this variant the cassette 6 has been transported beyond the position shown in FIG. 4 on a manually controlled electric industrial truck 14 and can be moved by the latter into a tool loading and unloading station where all places 1 to 10 of the cassette can be freed of tools or can be fitted with new tools. In a manner similar to that already described, these tools are then transported into the chain magazine, namely into the places 1 to 10.

As FIGS. 2 to 5 reveal, the cassette 6 rests on a table 15 which is provided with rollers 16. The apparatus has a transport mechanism (not shown) which transports the table together with the cassette from the normal position (FIG. 2) into the first position (FIG. 3) and back. The cassette is transported by a further mechanism (not shown) from the normal position into the position illustrated by FIG. 4. The cassette is then pulled manually onto the vehicle 14. The vehicle 14 is likewise fitted with rollers 17. Furthermore, it has a guide rail 18 which primarily ensures that the unsymmetrically loaded cassette 6 does not tilt. 19 designates a centering mechanism which ensures that the vehicle 14 is always in certain desired positions when the cassettes are to be exchanged. The vehicle 14 conventionally has a plurality of, e.g. three, cassette receptacle locations.

FIG. 6 shows first of all the cassette 6, a tool 20 and a receptacle 21 of the chain magazine. 22 designates a tool holder. The arrow P illustrates the movement of the cassette 6 having the tool 20. The magazine receptacle 21 is open at the bottom, and the tool 20, together with the holder 22, is moved up from below from the cassette 6 into the receptacle 21. After the holder 22 has been locked, the empty cassette 6 moves down again. (In FIG. 6, the holder 22 is shown by broken lines in the position in which it is engaged in the receptacle 21.) The receptacle of the cassette 6 engages into a trapezoidal groove 23 of the holder 22. 15 again designates the table.

FIGS. 7a, b and c show in three views the upper part of FIG. 6, i.e. a tool receptacle 21 of the chain magazine with inserted tool holder 22 and the cassette 6 in its upper ("1st") position. (In FIG. 7c the receptacle 21 and the holder 22 are omitted). As previously, the recess in the cassette 6, which serves to receive the tool, is designated by 7. It engages into the trapezoidal groove 23 of the holder 22. An anti-rotation lock of the chain pocket 21 is designated by 24 and a locking plate is designated by 25. The latter, with respect to FIG. 7a, can be moved to the right and then releases the inserted tool. The cassette has a support 26 which prevents tilting of the tool 20, 22. This support 26 is equipped with an anti-rotation lock 27 for the tool and a safety corner 28 preventing wrong insertion of a tool.

FIG. 8 shows the cassette 6 in perspective. 29 designates a locking mechanism which is used with a drive mechanism (see FIGS. 9a, b, c).

FIGS. 9a, b, c again show the cassette 6, the locking mechanism 29 and the table 15. A drive mechanism 30, when the table 15 is stationary, transports the cassette from the normal position into a "further" position and back. For this purpose, a part 30a of the drive mechanism 30 is locked to a part 29a of the locking mechanism 29. The lock can be unlocked manually via the handle 29b. The cassette can then be pulled further manually, e.g. onto the vehicle 14.

FIG. 10 shows another embodiment. The representation is comparable with the representation of FIG. 6. The cassette 6, the table 15, the tool holder 22 and a magazine pocket 21a can again be recognized. In this case, the magazine pocket 21a is closed at the bottom. The tool must therefore be removed from the pocket by means of a movement first of all to the right with respect to FIG. 10. The arrows 31 illustrates the movements of the cassette 6 having an inserted tool. The arrows 32 illustrate the movements of the cassette 6 without an inserted tool, i.e. before and after a tool is fetched.

FIG. 11 shows a further embodiment. The representation is likewise comparable with FIG. 6. Here, the magazine pocket 21b is open at the bottom in the area of the lower chain strand. The cassette 6' has a transverse web 33 which seizes the holder 22 via its groove 23. The arrows 34 illustrates the movements of the cassette having tools, the arrows 35 the movements without tools, that is, for fetching them and after depositing them.

It is further within the scope of the present invention to provide an apparatus wherein the chain magazine (1), having a fixed order of places in which an unworn tool during the return transport from the working spindle into the magazine (1) can be deposited again in its previous place, in which the chain magazine is subdivided into a storage area and a wear area. The storage area may be subdivided into a plurality of sub-areas, and the number of places in the sub-areas is equal to the number of places in the cassette (6). The number of places in the wear area is equal to the number of places in the cassette (6), or is less than the number of places in the cassette.

A worn tool, after use in the working spindle, can be deposited into the wear area, can be retrieved by means of the cassette (6) alone or together with further worn tools deposited there, and, if necessary, can be exchanged for new ones. Thereafter, the worn tool can be deposited, preferably immediately by means of a sorting operation, into the place in the storage area allocated to it, and tools can be exchanged via the sub-areas when there is a job change.

It is further within the scope of the present invention to provide an apparatus in which the chain magazine (1), having a variable order of places in which an unworn tool during the return transport from the working spindle into the magazine (1) can be deposited into any place, is subdivided into one or more change areas, a storage area and a wear area. The number of places in a change area is equal to the number of places in the cassette (6), the number of places in the wear area is equal to the number of places in the cassette (6) or is less than the number of places in the cassette, and the remaining places in the magazine (1) form the storage area. A worn tool, after use in the working spindle, can be deposited into the wear area, can be retrieved by means of the cassette (6) alone or together with further worn tools deposited in the wear area, and, if necessary, can be exchanged for new ones. Thereafter, preferably immediately, the worn tool can be deposited by means of a sorting operation into a place in the storage area. Tools, when there is a job change after the last workpiece is machined, can be deposited directly into the change area insofar as they are no longer required for the next job or where places must be cleared for additional tools required for the machining of the next job, and can be exchanged from there by changing the cassette. One or more change areas can also be used as one or more storage areas, which will necessitate a sorting operation when there is a job change.

I claim:

1. An apparatus for changing tools of a numerically controlled machining center having a tool chain magazine which has a straight chain strand, comprising first means having a plurality of tool receptacles which are arranged one behind the other, are immovable relative to one another and have the same spacings as the tool receptacles of the chain magazine, second means having means for accommodating said first means and for moving said first means between a normal position and a first position, third means for transferring one or more tools directly between said first means and said strand in said first position, said first means being loadable and unloadable with regard to the tools in said normal position, the improvement comprising said first means being a first cassette (6) consisting of a single piece, being movable from said normal position to said first position and back as accommodated on said second means and being slideably separable from said second means, and fourth means slideably accommodating plural cassettes for exchanging said first cassette (6) for another cassette in said normal position.

2. The apparatus as claimed in claim 1 wherein said fourth means includes means for moving said first cassette (6) into further positions for the total or cassette change, said further positions being located on one side of said normal positioning and spaced away from said first position a distance greater than the distance between said first and said normal positions.

3. The apparatus as claimed in claim 2, including means for exchanging one tool in the normal position and means for exchanging a plurality of tools or the first cassette (6) in the further positions.

4. The apparatus as claimed in claim 1 including a transfer area (11) of the chain strand (1) having a plurality of transfer places in which the number of transfer places in said transfer area (11) is at least equal to the number of said receptacles in the first cassette (6), said apparatus including units (10, 12, 13) allocated to the transfer places for locking and unlocking the tools in the chain (1), and means for actuating said locking units (10, 12, 13) individually or in blocks.

5. The apparatus as claimed in claim 4 wherein a rearmost transfer place is provided for individual tool exchange, a first plurality of transfer places together with said rearmost place are provided for block exchange, and a second plurality of transfer places together with said rearmost place and said first plurality of places being provided for further block exchange.

6. The apparatus as claimed in claim 1 wherein the first cassette (6) is an elongated plate and the receptacles are U-shaped recesses (7) starting at a longitudinal edge of the plate.

7. The apparatus as claimed in claim 6, in which the chain of the magazine is arranged in a vertical plane, the tools are arranged perpendicularly to said vertical plane, and the magazine is loaded or unloaded by movements of the tools in said vertical plane, wherein a tool exchange location (11) is defined in the area of the lower chain strand (1), and the first cassette (6) is movable away from the strand (1) in an initially downward direction and then to the back, and the first cassette is movable toward the strand in the opposite direction.

8. The apparatus as claimed in claim 6, in which the chain of the magazine is arranged in a vertical plane, the tools are arranged perpendicularly to said vertical plane, and the magazine is loaded and unloaded by movements of the tools perpendicularly to said vertical plane, wherein a tool exchange location is defined in the area of the lower chain strand, and the first cassette is movable away from the strand initially in a direction laterally and horizontally, then downward and to the back, and said first cassette is movable toward the strand in the opposite direction.

9. The apparatus as claimed in claim 6, in which the chain of the magazine is arranged in a vertical plane, the tools are arranged in said vertical plane, and the magazine is loaded and unloaded by movements of the tools in said vertical plane, wherein a tool exchange location is defined in the area of the lower chain strand, and the first cassette is movable away from the strand initially in a downward direction, then laterally and horizontally and then to the back, and said first cassette is movable toward the strand in the opposite direction.

10. The apparatus as claimed in claims 6, 7, 8 or 9 in which said U-shaped recess (7) defined in said first cassette, in the first position, engages into a groove (23) of a tool holder (22) which in turn is seated in the receptacle of the chain magazine (1).

11. The apparatus as claimed in claim 1 wherein, in the normal position of the first cassette (6), a tool can be inserted manually into a rearmost receptacle of the first cassette (6), or a tool can be removed manually from said rearmost receptacle.

12. The apparatus as claimed in claim 2 wherein, in a rearmost further position of the first cassette (6), one or more tools can be inserted manually into the first cassette (6) or removed manually from the first cassette, or the first cassette (6) can be exchanged for another.

13. The apparatus as claimed in claim 1, comprising a vehicle (14) which can be driven at the back of the machining center, said fourth means including means for moving said first cassette (6) onto the vehicle (14).

14. The apparatus as claimed in claim 13, wherein the vehicle (14) has a plurality of cassette receptacles and, before or after a cassette change operation, carries one cassette less than there are receptacles, said apparatus further including:
   (1) means for moving an empty cassette (6), located directly next to or below the strand (1) in the normal position, into the first position,
   (2) means for removing predetermined tools from the strand (1) by said cassette (6),
   (3) means for moving the cassette (6) into the empty receptacle of the vehicle (14),
   (4) means for moving a cassette (6) located on the vehicle (14) and fitted with tools into the first position after appropriate displacement of the vehicle,
   (5) means for transferring the tools to the magazine (1), and
   (6) means for moving the empty cassette (6) into the normal position.

15. The apparatus as claimed in claim 13 or 14, including means for automatically moving said vehicle, and means for automatically exchanging said cassette (6).

16. The apparatus as claimed in claim 1, wherein the first cassette (6) rests on a table (15), said apparatus including means for guiding the table (15) horizontally and vertically.

17. The apparatus as claimed in claim 16, including means for moving the table (15) between the normal position and the first position.

18. The apparatus as claimed in claim 17, including a drive mechanism (30) for moving the first cassette (6) between the normal position and one or more of said further positions when said table (15) is stationary.

19. The apparatus as claimed in claim 18, wherein the first cassette (6) has a locking mechanism (29) for acting on the drive mechanism (30).

20. The apparatus as claimed in claim 19, including means for releasing the locking mechanism (29) for changing the first cassette (6).

21. The apparatus as claimed in claim 1 wherein the first cassette (6), in said normal position, is spaced at least a distance from the chain magazine (1) such that the chain magazine (1) loaded with tools is movable past an empty cassette (6).

22. The apparatus as claimed in claim 1, including means (26) for preventing tools (20) in the first cassette (6) from tilting.

23. The apparatus as claimed in claim 22, including toolholders (22) having a groove (23), a U-shaped recess (7) defined as a tool receptacle in the first cassette (6), and a support (26) on the first cassette (6), said support (26) acting on the outer surface of the groove flange and being directed toward said holder.

24. The apparatus as claimed in claim 1, wherein the chain magazine (1), in a fixed order of places in which an unworn tool, during the return transport from a working spindle into the magazine (1), can be deposited again in its previous place, is subdivided into a storage area and a wear area and the storage area is subdivided into a plurality of sub-areas, wherein the number of places in the sub-areas is at least equal to the number of places in the first cassette (6), and the number of places in the wear area does not exceed the number of places in the first cassette (6), said apparatus including means for depositing a worn tool, after use in said working spindle, into said wear area; means for retrieving by the first cassette (6) said deposited worn tool, either individually or together with other worn tools deposited in said wear area; means for exchanging retrieved tools for new tools, if necessary; means for sorting and depositing said retrieved or exchanged new tools in positions allocated for said tools in said storage area; and means for exchanging said tools via the sub-area when a job change occurs.

25. The apparatus as claimed in claim 1, wherein the chain magazine (1) in a variable order of places in which an unworn tool, during the return transport from a working spindle into the magazine (1), can be deposited into any place, is subdivided into one or more change areas, a storage area and a wear area, wherein the number of places in a change area is at least equal to the number of places in the first cassette, the number of places in the wear area does not exceed the number of places in the first cassette (6), and the remaining places in the magazine (1) form the storage area, said apparatus including means for depositing a worn tool, after use in the working spindle, into said wear area; means for retrieving by said cassette said depositing worn tool, either individually or together with other worn tools deposited in said wear area; means for exchanging retrieved tools for new tools if necessary; means for sorting and depositing said retrieved or exchanged new tools into a place in said storage area; means for depositing tools, when there is a job change after the last workplace is machined, directly into the change area when such tools are not required for the next job or when places are to be cleared for additional tools required for the machining of the next job, and means for exchanging said tools in said change area by said cassettes.

26. The apparatus as claimed in claim 25, wherein one or more change areas can also be used as one or more storage areas, said apparatus further including means for sorting said tools when a job change occurs.

* * * * *

UNITED STATES PATENT AND TRADEMARK OFFICE
CERTIFICATE OF CORRECTION

PATENT NO. : 4,893,399

DATED : January 16, 1990

INVENTOR(S) : Helmut Hammer

It is certified that error appears in the above-identified patent and that said Letters Patent is hereby corrected as shown below:

Column 5, Line 64 (Claim 2, Line 3):

Delete "total" and substitute -- tool --.

Column 5, Line 66 (Claim 2, Line 5):

Delete "positioning" and substitute -- position --.

Column 8, Line 39 (Claim 25, Line 14):

Delete "depositing" and substitute -- deposited --.

Signed and Sealed this

Eighth Day of January, 1991

Attest:

HARRY F. MANBECK, JR.

*Attesting Officer*  *Commissioner of Patents and Trademarks*